United States Patent
McRobert

(10) Patent No.: US 7,448,498 B2
(45) Date of Patent: Nov. 11, 2008

(54) SPREADING DEVICE AND ADJUSTABLE GRADING SYSTEM INCORPORATING SAME

(76) Inventor: Ian McRobert, 148 Eleventh Road, Wungong (AU) WA6112

( * ) Notice: Subject to any disclaimer, the term of this patent is extended or adjusted under 35 U.S.C. 154(b) by 106 days.

(21) Appl. No.: 10/570,552

(22) PCT Filed: Sep. 5, 2003

(86) PCT No.: PCT/AU03/01157

§ 371 (c)(1), (2), (4) Date: Jul. 18, 2006

(87) PCT Pub. No.: WO2004/022251

PCT Pub. Date: Mar. 18, 2004

(65) Prior Publication Data

US 2007/0000816 A1 Jan. 4, 2007

(30) Foreign Application Priority Data

Sep. 5, 2002 (AU) .............................. 2002951207

(51) Int. Cl.
B07B 1/46 (2006.01)
(52) U.S. Cl. ..................................... 209/394; 209/676
(58) Field of Classification Search ................. 209/667, 209/668, 674–676, 394
See application file for complete search history.

(56) References Cited

U.S. PATENT DOCUMENTS

| | | | | |
|---|---|---|---|---|
| 742,158 A * | 10/1903 | Burke | ......................... | 209/394 |
| 1,420,685 A * | 6/1922 | Burch | ........................ | 209/393 |
| 1,711,740 A * | 5/1929 | McCann | ...................... | 198/782 |
| 2,420,941 A * | 5/1947 | Fies | ............................ | 209/358 |
| 4,770,190 A * | 9/1988 | Barnett | ....................... | 460/102 |
| 5,782,365 A * | 7/1998 | Zreloff et al. | ............... | 209/674 |
| 6,053,330 A | 4/2000 | Lavoie | | |
| 6,336,560 B1 * | 1/2002 | Schaefer | ..................... | 209/676 |

FOREIGN PATENT DOCUMENTS

| | | |
|---|---|---|
| JP | 09225410 A | 9/1997 |
| NZ | 314846 A | 8/1998 |

* cited by examiner

Primary Examiner—Joseph C Rodriguez
(74) Attorney, Agent, or Firm—Allen, Dyer, Doppelt, Milbrath & Gilchrist, P.A.

(57) ABSTRACT

An adjustable grading system 10 comprises a frame 12, a plurality of elongated bars 14 retained at opposite ends within the frame 12 and moveable along the frame, and a spreading device 16. The spreading device 16 is provided with a plurality of recesses 18 each for receiving a bar 14. Adjacent recesses 18 are spaced apart by a pre-determined spacing distance D and separated by a tooth 20. The spreading device 16 includes first and second combs 40 and 42 each of which are pivotally coupled to link bars 46 and 48. The pivot connection allows the spreading device 16 to be manipulated so that the distance between the combs 40 and 42 can be varied while maintaining them parallel to each other. A group of bars 14 can be spaced by the spacing distance D by orientating the device 16 so that the combs 40 and 42 extend diagonally across the group of bars 14 at an angle so that their respective teeth 20 are disposed between adjacent bars 14. The combs are then pushed onto the bars 14 so that individual bars are guided into respective recesses. By manipulating the device 16 so that the combs 40 and 42 lie substantially transversely to the bars 14, the bars 14 are spaced by the spacing distance D.

12 Claims, 3 Drawing Sheets

SPREADING DEVICE AND ADJUSTABLE GRADING SYSTEM INCORPORATING SAME

FIELD OF THE INVENTION

The present invention relates to the fields of grading of articles by size and spacing of articles. More particularly, though not exclusively, the present invention relates to the grading of fish.

BACKGROUND OF THE INVENTION

The present invention was developed to provide an adjustable grading system for the grading of marine animals, and in particular fish, by size. It is known when grading fish, to use a grading system which comprises a grate formed from a plurality of parallel fixed, spaced apart bars or rods. As the bars or rods are fixed, it is not possible to change their spacing in order to vary the size of the fish which can pass through the grate. In order to grade fish of different sizes, a plurality of grates are required where the bar or rod spacing is different.

The present invention was initially developed with the view to providing an adjustable grading system for marine animals. However it has been discovered that embodiments of the invention have a much broader application and can be used for grading many types of articles by size and moreover can be used to evenly space articles.

SUMMARY OF THE INVENTION

According to one aspect of the present invention there is provided an adjustable grading system comprising:
  a frame;
  a plurality of elongated elements retained at opposite ends within said frame and moveable along said frame;
  a spreading device provided with a plurality of recesses each for receiving an elongated element, adjacent recesses spaced apart by a pre-determined distance and separated by a tooth;

wherein a group of said elongated elements are spread by said pre-determined distance by orientating said spreading device so that said recesses extend diagonally across said elongated elements at an angle such that respective teeth are disposed between adjacent elongated elements, pushing said teeth between said adjacent elongated elements so that individual elongated elements are guided into respective recesses, and re-orientating said recesses to lie substantially transverse to said elongated elements, thereby spacing said elongated elements by said pre-determined distance.

Preferably said spreading device comprises:
  first and second combs, each comb provided with a plurality of recesses, each for receiving an elongated element, adjacent recesses spaced apart by said pre-determined distance and separated by a tooth; and,
  a link arrangement linking said first and said second combs together in a manner whereby the distance between said first and second combs can be varied while maintaining said first comb substantially parallel to said second comb.

Preferably said link arrangement comprises first and second link bars, each link bar pivotally coupled to each of first and second combs.

Preferably said link bars are substantially parallel to each other. However, in an alternate arrangement, said first and second link bars may cross each other.

Preferably said spreading device further comprises first and second slats pivotally coupled to said first and second link bars and said first and second combs are detachably coupled to said first and second slats respectively.

Preferably each recess increases in width in a direction from a root of the recess toward a free end of a tooth adjacent that recess.

Preferably each tooth is tapered to reduce in width in a direction towards its free end.

Preferably the free end of each tooth is shaped to seat between adjacent elongated elements when said adjacent elongated elements are in contact side-by-side.

Preferably said elements are shaped so that when two adjacent elongated elements are in contact side-by-side, a valley is formed therebetween.

Preferably at least each alternate elongated element has a substantially circular cross-section.

Preferably each of said elongated elements has a substantially circular cross-section.

Preferably said frame includes first and second opposed tracks each for receiving one of the ends of each of said elongated elements.

Preferably at least one of said tracks is provided with an aperture through which an elongated element can be inserted into, or withdrawn from, said frame.

According to the invention there is also provided a spreading device for spreading a plurality of side-by-side elements by a pre-determined distance, said device comprising a plurality of recesses, each recess configured for receiving an element, adjacent recesses spaced apart by said pre-determined distance and separated by a tooth, wherein a group of said elements can be spread by said pre-determined distance by orientating said spreading device so that said recesses extend diagonally across said group of elements at an angle such that respective teeth are disposed between adjacent elements, pushing said teeth between said adjacent elements so that individual elements are guided into respective recesses, and re-orientating said spreading device so that said recesses lie substantially transverse to said elements, thereby spreading said articles by said pre-determined distance.

Preferably said spreading device further comprises first and second combs, each comb provided with a plurality of said recesses, adjacent recesses separated by a respective tooth.

Preferably said system further comprises one or more spacers which engage said elongated elements after said elongated elements are spaced by said pre-determined distance and maintain the spacing of said elongated elements after removal of said spreading device; and,
  a link arrangement linking said first and second combs together in a manner whereby the distance between said first and second combs can be varied while maintaining said first comb substantially parallel to said second comb.

According to the present invention there is also provided a method of spacing a plurality of side-by-side elements by a spacing distance comprising the steps of:
  (a) providing a spreading device provided with a plurality of recesses, each recess for receiving one of said elements, adjacent recesses spaced apart by a spacing distance and separated by a tooth;
  (b) juxtaposing said elements relative to each other so that mutually adjacent elements are spaced by a distance less than said spacing distance;
  (c) orientating said spreading device so that said recesses extend diagonally across a group of said elements and respective teeth are disposed between adjacent elements;

(d) pushing said device onto said elements so that individual elements are guided into respective recesses; and, (e) re-orientating said spreading device so that said recesses lie substantially transverse to said elongated elements, thereby spacing said elongated elements by said spacing distance.

Throughout this specification the term "comprising" is used inclusively, in the sense that there may be other features and/or steps included in the invention not expressly defined or comprehended in the features or steps subsequently defined or described. What such other features and/or steps may include will be apparent from the specification read as a whole.

BRIEF DESCRIPTION OF THE DRAWINGS

An embodiment of the present invention will now be described by way of example only with reference to the accompanying drawings in which.

DETAILED DESCRIPTION OF PREFERRED EMBODIMENT

Figure 1:
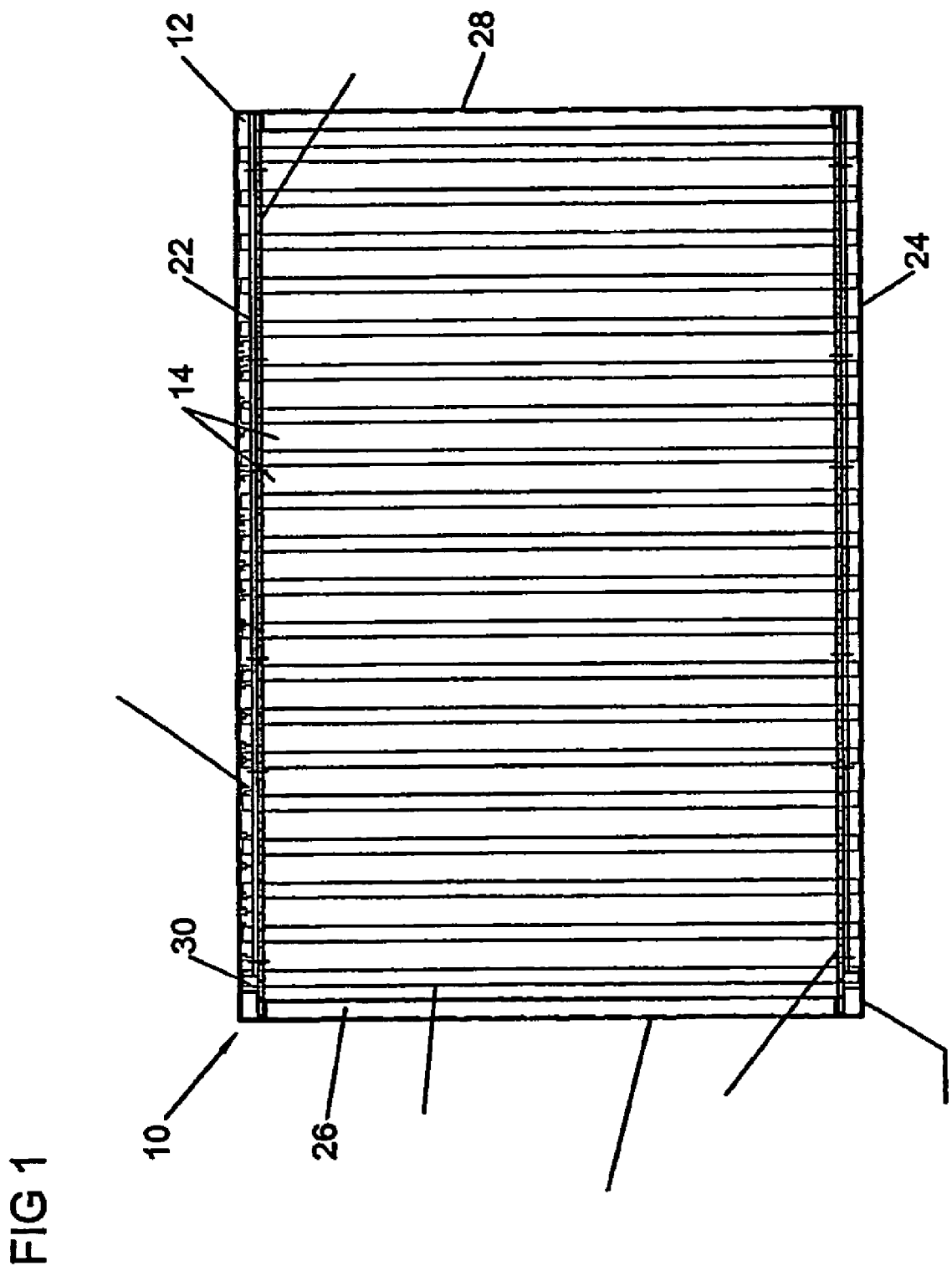
FIG. 1 is a plan view of an adjustable grading system in accordance with the present invention.

Referring to the accompanying drawings, and in particular FIGS. 1-5, an adjustable grading system 10 which may for example, be used for grading fish, comprises a frame 12, a plurality of elongated elements in the form of bars 14 retained at opposite ends within the frame 12 and moveable along the frame; and a spreading device 16. The spreading device 16 is provided with a plurality of recesses 18 each for receiving a bar 14 (see FIG. 5). Adjacent recesses 18 are spaced apart by a pre-determined distance D and separated by a tooth 20 (see FIG. 4).

Figure 3:
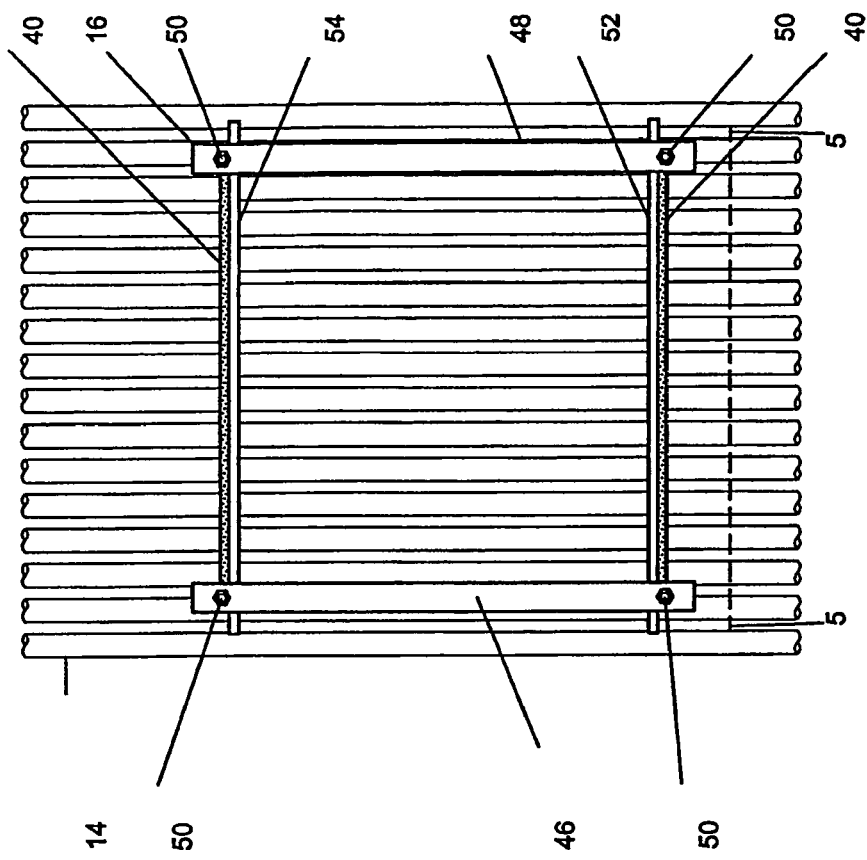
FIG. 3 is a plan view of the grading system upon grade settings.
Figure 2:
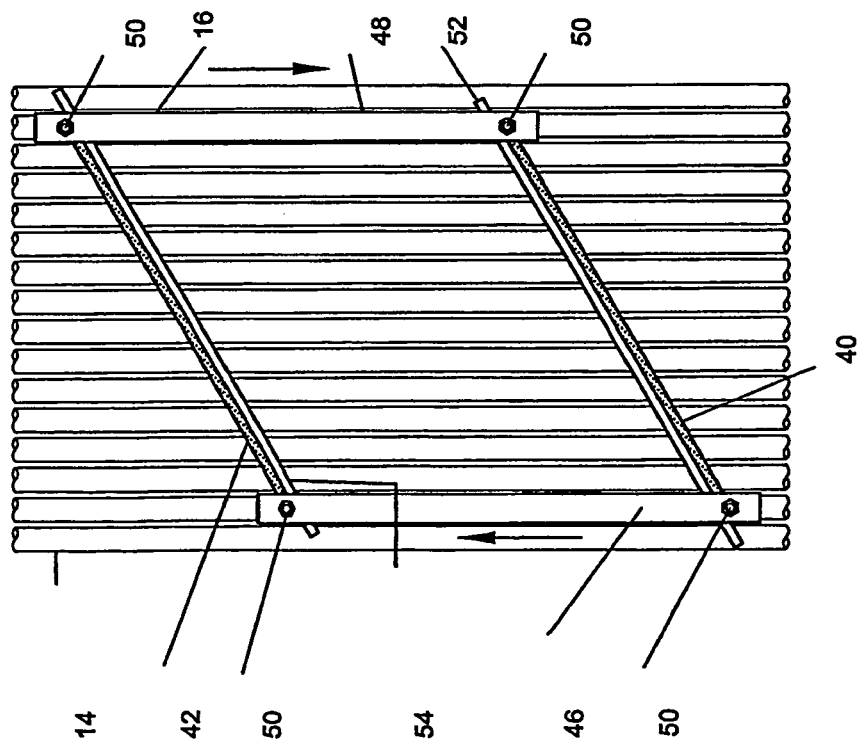
FIG. 2 is a plan view of a portion of the adjustable grading system prior to grade setting.
Figure 5:
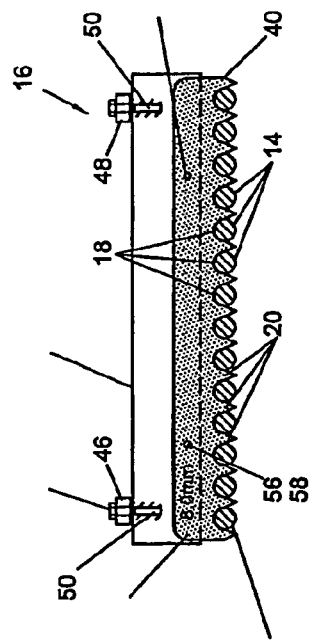
FIG. 5 is a view of Section 5-5 of the grading system shown in FIG. 3.
Figure 7:
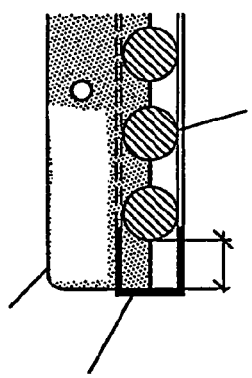
FIG. 7 is a view of Section B taken through the grading system shown in FIG. 2.

From FIGS. 2 and 3, it can be seen that a group of bars 14 can be spaced by the grading distance D by orientating the spreading device 16 so that the recesses 18 extend diagonally across the group of bars 14 at an angle such that respective teeth 20 are disposed between adjacent bars 14, then pushing the teeth 20 between adjacent bars 14 so that individual bars 14 are guided into respective recesses 18 and then re-orientating the spreading device 16 so that the recesses 18 lie substantially transverse to the bars 14 (as shown in FIGS. 3 and 5). Now, the bars 14 are spaced apart by the distance D.

Looking at the grading system in more detail, the frame 12 is, in this embodiment, a rectangular frame composed of a pair of parallel spaced apart tracks 22 and 24 and opposite side members 26 and 28. Opposite ends of the side member 26 are coupled to respective ends of the tracks 22 and 24 with opposite ends of the side member 28 coupled to the other ends of the tracks 22 and 24. The tracks 22 and 24 are of a generally C or U shaped cross-section with the openings of the C or U facing each other and forming respective seats in which opposite ends of each of the bars 14 are received. The side members 26 and 28 are also of a similar shape and configuration although they need not necessarily be so. As is apparent from FIG. 6, an opening or gap 30 is formed in the track 22 of a width greater than the width of a bar 14 to allow the bars 14 to be inserted into, or withdrawn from, the frame 12. A similar opening 30 may be formed in the track 24 in alignment with the opening formed in the track 22.

Figure 6:
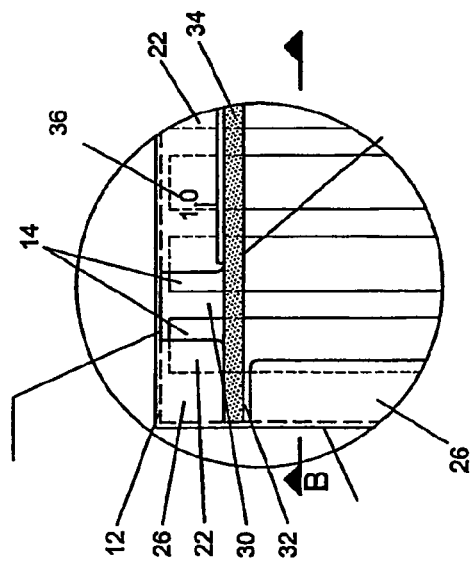
FIG. 6 is an enlarged view of a portion of the grading system shown in FIG. 1.

As shown in FIG. 6, a small transverse cut-out 32 is formed in an end of the side member 26 adjacent the track 22 before receiving a spacer plate 34. Similar cut-outs are formed at the opposite end of the side member 26 adjacent the track 24 and near opposite ends of the side member 28 adjacent the tracks 22 and 24.

A bar count indicator 36 may be conveniently marked on one or both of tracks 22 and 24 to provide a count of the number of bars 14 of a particular diameter held within the frame 12. The indicator would be applicable when the bars 14 are in mutual contact side-by-side prior to being spaced or spread by the spreading device 16. The bar count indicator 36 can include a number of different scales each relating to bars 14 of different diameter.

Figure 8:
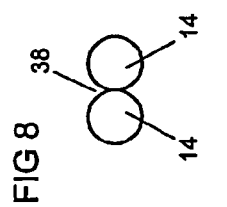
FIG. 8 is an end view of two elements prior to being spread.

As depicted in FIG. 8, the bars 14 are shaped so that when two adjacent bars 14 are in contact side-by-side, a valley 38 is formed therebetween. This can be most conveniently achieved by forming each of the bars 14 to have a circular cross-section. However, it would be appreciated that a valley 38 would also be formed where the bars 14 are of generally square cross-section but with rounded corners, or where there is an interleaving of alternately shaped square and circular cross-section bars 14. Nevertheless, it is believed to be most convenient for all the bars 14 to be circular as it allows for easy moving (rolling) of the bars 14 along the tracks 22 and 24.

Referring to FIGS. 2-5, the spreading device 16 includes first and second combs identical 40, 42. Each comb is provided with a plurality of the recesses 18 spaced by the distance D with adjacent recesses 18 separated by a tooth 20. The spreading device 16 also includes a link arrangement 44 linking the first and second combs 40,42 together in a manner whereby the distance between the combs 40,42 can be varied while maintaining the combs 40,42 parallel to each other. The link arrangement 44 includes first and second identical link bars 46 and 48, each of which is pivotally coupled at opposite ends to each of the combs 40 and 42. More particularly, the link bars 46 and 48 are pivotally coupled via pivot pins 50 to respective comb supports slats 52 and 54 to which the combs 40 and 42 respectively are removably attached.

The removable attachment of the combs 40 and 42 to their respective support slats 52 and 54 is achieved by forming two laterally extending pins 56 on each of the support slates 52 and 54 for registering, with an interference fit, with corresponding holes 58 formed in the combs 40,42. In this way the combs 40,42 can be interchanged with other combs having recesses 18 of different spacing D.

It would be appreciated that due to the above construction, the spreading device 16 can be pushed or pulled between a parallelogram shape, as shown in FIG. 2 and a rectangular (or square), as shown in FIG. 3 so that the (transverse) distance between the combs 40 and 42 can be varied while maintaining the combs 40 and 42 mutually parallel.

Each of the recesses 18 is configured so as to increase in width in a direction from a root of the recess 18 toward a free end 62 of a tooth 20 adjacent that recess 18. Similarly, each tooth 20 is tapered to reduce in width in a direction toward its free end 62. Further, the free end 62 of each tooth is shaped to seat in the valley 28 between adjacent bars 14 when the bars 14 are in contact side-by-side.

Figure 9:
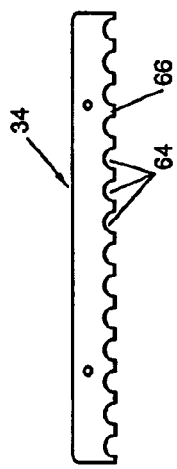
FIG. 9 is an elevation view of a spacer plate incorporated in the adjustable grading system.
Figure 4:
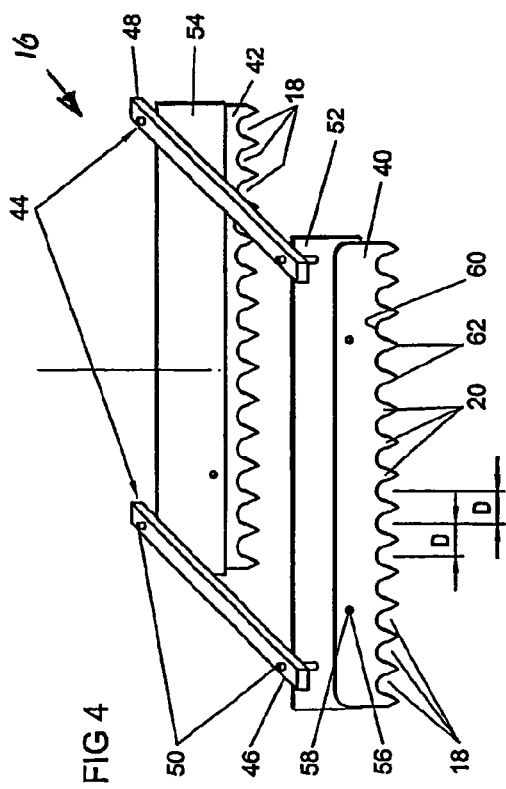
FIG. 4 is a perspective view of an embodiment of a spreader device incorporated in the grading system.

Referring to FIG. 9, the spacer plates 34 are provided with a plurality of recesses 64 of a spacing D to match the spacing on the combs 40 and 42. Adjacent recesses 64 are also separated by a tooth 66. However, in the spacer 34, the recesses 64 are of constant radius and the teeth 66 formed with flat or squared free ends.

When it is desired to space the bars 14 in the grading system 10 by distance D, a plurality of bars 14 are inserted into the frame 12 via the opening 30. The number of bars required to fill the frame 12 when spaced by distance D may be provided by a chart or table. In order to spread the bars 14 by the distance D, a group of bars 14 is juxtaposed so as to be in mutual side-by-side contact or at least generally spaced by a distance less than distance D. The device 14 is then orientated so that the recesses 18 (and thus the combs 40 and 42) extend diagonally across the group of bars 14 at an angle so that respective teeth 20 are disposed between adjacent bars 14. The teeth 20 are then pushed between the adjacent bars 14 so that individual bars 14 are guided into respective recesses 18. This configuration is shown in FIG. 2. The device 14 is then re-orientated by pushing and pulling in opposite directions on the link bars 46 and 48 to pull the device 16 into the rectangular or square shape whereby the recesses 18 (and thus the combs 40 and 42) lie substantially transverse to the bars 14. This configuration is shown in FIGS. 3 and 5. In this configuration, it will be appreciated that the bars 14 are spaced by the distance D. This group of bars can then be rolled while still engaged by the device 16 along the tracks 22 and 24 to the end of the frame 12 adjacent the side bar 28. Prior to removing the device 16, two spacer plates 34 can be placed over the ends of the bars 14 adjacent the tracks 22 and 24 of the plates 34 each having one end seated within a cut-out 32. This maintains the spacing D between the bars 14. The device 16 can then be pulled off and re-used in a similar manner to spread a next group of bars 14 which can then be again simply moved along the tracks 22 and 24 and held in place by further spacer plates 34.

Clips, detents or other catches or releasable locking mechanisms can be used to positively hold the spacer plates 34 onto the bars 14. The frame 12 with the bars 14 locked in place to maintain their spacing D can then be incorporated into a fish grading system (not shown) to allow fish of a width less than distance D to pass therethrough while preventing fish of greater width from passing between the bars 14.

From the above description, it will also be apparent that the spreading device 16 can be used for spreading articles other than bars 14 in a grading system. For example, device 16 can be used to evenly space planks of wood. Further, the grading system 10 can be used for grading articles other than fish, for example fruit.

Now that an embodiment of the present invention has been described in detail it will be apparent to those skilled in the relevant arts that numerous modifications and variations may be made without departing from the basic inventive concepts. For example, in the device 16, the link bars 46 and 48 are pivotally coupled to the combs 40 and 42 in a manner so that they remain substantially parallel. However in an alternate configuration, the link bars 46 and 48 may be crossed to form an X shape.

All such modifications and variations together with others that would be obvious to a person of ordinary skill in the art are deemed to be within the scope of the present invention the nature of which is to be determined from the above description and the appended claims.

What is claimed is:

1. An adjustable grading system comprising:
    a frame;
    a plurality of elongated elements retained at opposite ends within said frame and moveable along said frame;
    a spreading device provided with a plurality of recesses each for receiving an elongated element, adjacent recesses spaced apart by a pre-determined distance and separated by a tooth;
    wherein a group of said elongated elements are spread by said pre-determined distance by orientating said spreading device so that said recesses extend diagonally across said elongated elements at an angle such that respective teeth are disposed between adjacent elongated elements, pushing said teeth between said adjacent elongated elements so that individual elongated elements are guided into respective recesses, and re-orientating said recesses to lie substantially transverse to said elongated elements, thereby spacing said elongated elements by said pre-determined distance.

2. The system according to claim 1, wherein said spreading device comprises:
    first and second combs, each comb provided with a plurality of recesses, each for receiving an elongated element, adjacent recesses spaced apart by said pre-determined distance and separated by a tooth; and,
    a link arrangement linking said first and second combs together in a manner whereby the distance between said first and second combs can be varied while maintaining said first comb substantially parallel to said second comb.

3. The system according to claim 2, wherein said link arrangement comprises first and second link bars, each link bar pivotally coupled to each of said first and second combs.

4. The system according to claim 3, wherein said spreading device further comprises first and second slats pivotally coupled to said first and second link bars and said first and second combs are detachably coupled to said first and second slats respectively.

5. The system according to claim 1, further comprising one or more spacers which engage said elongated elements after said elongated elements are spaced by said pre-determined distance and maintain the spacing of said elongated elements after removal of said spreading device.

6. The system according to claim 1, wherein said frame includes first and second opposed tracks each for receiving one of the ends of each of said elongated elements.

7. The system according to claim 6, wherein at least one of said tracks is provided with an aperture through which an elongated element can be inserted into, or withdrawn from, said frame.

8. The system according to claim 1, wherein said elements are shaped so that when two adjacent elongated elements are in contact side-by-side, a valley is formed therebetween.

9. The system according to claim 1, wherein at least each alternate elongated element has a substantially circular cross-section.

10. A spreading device for spreading a plurality of side-by-side elements by a pre-determined distance, said device comprising:
    a plurality of recesses, each recess configured for receiving an element, adjacent recesses spaced apart by said pre-determined distance and separated by a tooth, wherein a group of said elements can be spread by said pre-determined distance by orientating said spreading device so that said recesses extend diagonally across said group of elements at an angle such that respective teeth are disposed between adjacent elements, pushing said teeth between said adjacent elements so that individual elements are guided into respective recesses, and re-orientating said spreading device so that said recesses lie substantially transverse to said elements, thereby spreading said articles by said pre-determined distance;

first and second combs, each comb provided with a plurality of said recesses, adjacent recesses separated by a respective tooth; and a link arrangement linking said first and second combs together in a manner whereby the distance between said first and second combs can be varied while maintaining said first comb substantially parallel to said second comb.

11. The spreading device according to claim 10 further comprising first and second slats pivotally coupled to said first and second link bars and said first and second combs are detachably coupled to said first and second slats respectively.

12. A method of spacing a plurality of side-by-side elements by a spacing distance comprising the steps of:
 (a) providing a spreading device provided with a plurality of recesses, each recess for receiving one of said elements, adjacent recesses spaced apart by a spacing distance and separated by a tooth;
 (b) juxtaposing said elements relative to each other so that mutually adjacent elements are spaced by a distance less than said spacing distance;
 (c) orientating said spreading device so that said recesses extend diagonally across a group of said elements and respective teeth are disposed between adjacent elements;
 (d) pushing said device onto said elements so that individual elements are guided into respective recesses; and,
 (e) re-orientating said spreading device so that said recesses lie substantially transverse to said elongated elements, thereby spacing said elongated elements by said spacing distance.

\* \* \* \* \*